United States Patent [19]

Chartraire et al.

[11] 4,070,584
[45] Jan. 24, 1978

[54] OBJECT-IDENTIFICATION SYSTEM WITH SEQUENTIALLY ACTIVATED PHOTOCELL ARRAY

[75] Inventors: Jacques Chartraire; Jean Le Coeur; Jacques Pouliquen, all of Paris, France

[73] Assignee: Thomson-CSF, Paris, France

[21] Appl. No.: 641,658

[22] Filed: Dec. 17, 1975

[30] Foreign Application Priority Data

Dec. 20, 1974 France .................................. 74 42371

[51] Int. Cl.² .......................... G06K 7/10; G06K 9/00
[52] U.S. Cl. .................................. 250/555; 250/208; 250/567; 235/454
[58] Field of Search .................... 250/567, 568, 222 R, 250/206, 221, 208, 566, 555, 578; 340/146.3 K, 146.3 C; 235/61.11 E; 356/200

[56] References Cited

U.S. PATENT DOCUMENTS

| 3,145,291 | 8/1964 | Brainerd | 250/568 |
| 3,480,762 | 11/1969 | Del Vecchio | 235/61.11 E |
| 3,805,061 | 4/1974 | Des Missimy | 250/221 |
| 3,835,332 | 9/1974 | Bridges | 356/200 |

FOREIGN PATENT DOCUMENTS 2,208,606  9/1972  Germany .............................. 250/568

Primary Examiner—Alfred E. Smith
Assistant Examiner—David K. Moore
Attorney, Agent, or Firm—Karl F. Ross

[57] ABSTRACT

An object-identifying system is described comprising at least one device for remotely identifying a plurality of objects bearing each a characteristic code in the form of a badge which has alternating reflective and non-reflective strip zones. The objects may be moving past the device but could also be motionless. When illuminated by a light source, the badge reflects a part of the incident light beam to an opto-electrical transducer which is formed by a number of diodes in a row. Control means allow the photodiodes to be switched on and off in succession to scan the badge. The length of the row of diodes is generally greater than the length of the code support in the scanning direction to allow for any possible disalignment between the support and the identification device.

10 Claims, 10 Drawing Figures

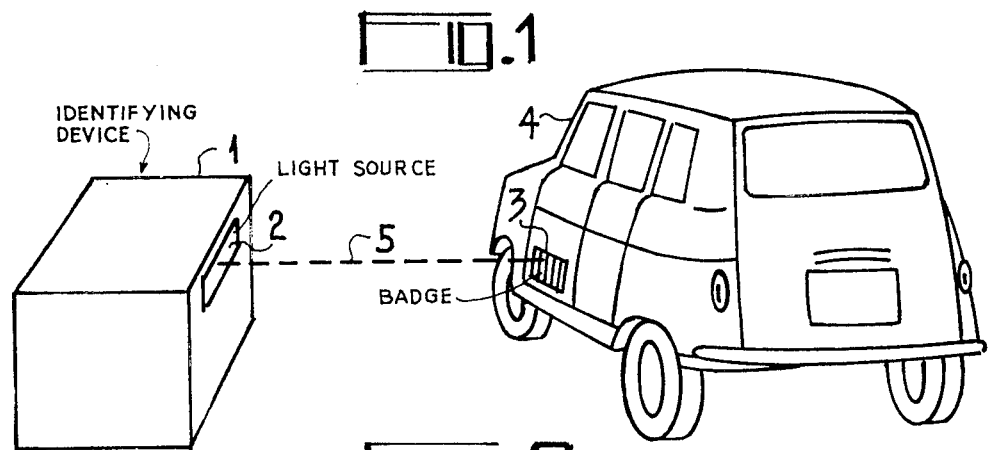
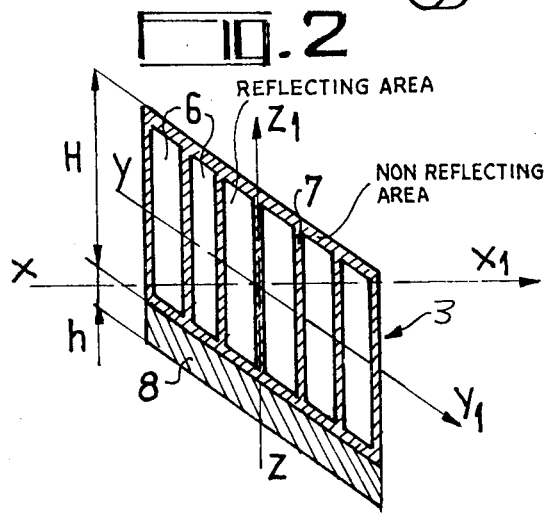
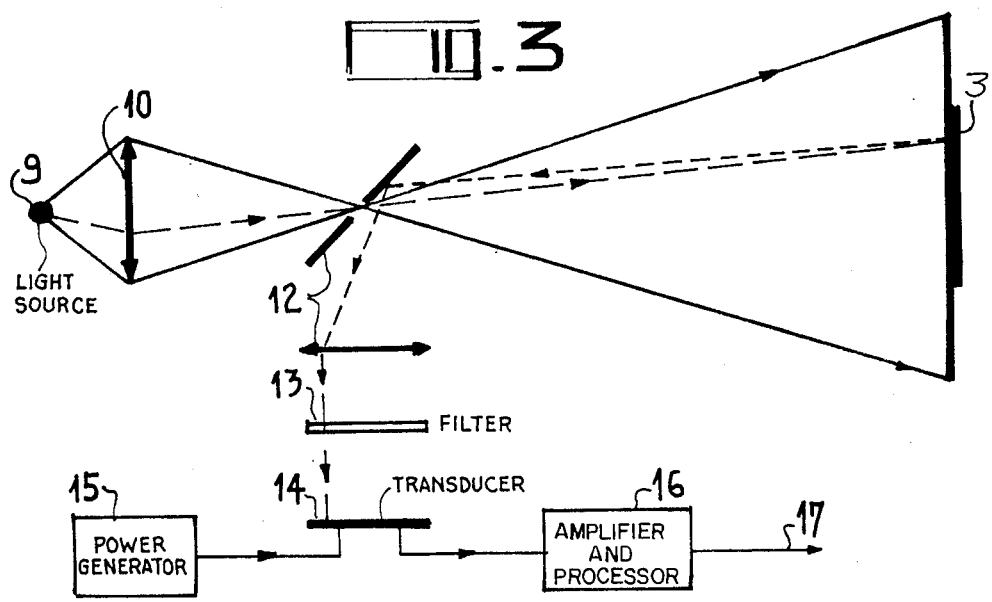

OBJECT-IDENTIFICATION SYSTEM WITH SEQUENTIALLY ACTIVATED PHOTOCELL ARRAY

BACKGROUND OF THE INVENTION

The present invention relates to an object-identification system in which moving or fixed objects, bearing characteristic codes, pass a device comprising means for remotely identifying these objects by reading their code.

An important application of our invention is in the identification of land vehicles, in particular motor cars, which in this case are fitted with a carrier member or support bearing the code that identifies the vehicles and is deciphered by detecting and processing the light radiation which the member reflects when subjected to illumination from a light source.

Thus, the identification device is of the opto-electrical type inasmuch as the information carried by the support associated with the object to be identified is picked up by optical means and its subsequent processing is performed by electrical or electronic means. In general terms, with such devices the illuminated object to be identified, (or that portion of it which carries) the characteristic information reflects part of the impinging light energy, now modulated by the code, to a detector which picks it up and transmits it to an electrically operated decoder. Devices of this nature are known and have already been constructed in practical form. In certain of these conventional devices, the light source employed is a laser emitting a fine single-color beam which illuminates the information carrier. The system used to displace the light beam is generally a rotating mirror drum which transmits incident light energy to the carrier and which transmits the energy reflected by the latter to an opto-electrical transducer of the photomultiplier type. Such devices obviously have the advantage of a good signal-to-noise ratio, chiefly as a result of the narrowness of the laser spectrum, but nonetheless they have some disadvantages, in particular the fact that the light beam is swept mechanically and that the laser ages when in a state of inactivity, aside from their high cost. It is possible to use a focused light source in lieu of a laser, but the mirror drum is still needed.

Another type of identification device is constructed around a television camera. The illuminating light source is then an incandescent lamp. Such a device has the advantages that it contains no mechanical moving parts, that it is small in size, and that its manufacturing cost is acceptable, but its low performance, its poor signal-to-noise ratio and the very large amount of light it requires make its use not very attractive.

OBJECT AND SUMMARY OF THE INVENTION

The object of our invention is to overcome these disadvantages and, in particular, to avoid the use of an optical scanner of the mirror-drum type associated with a laser or a focused light source.

Our improved system for remotely identifying objects bearing coded information, in the form of alternating reflecting and non-reflecting zones, comprises a light source, first optical means concentrating a steady light beam onto the information carrier (referred to hereinafter as a badge), second optical means imaging the reflecting and non-reflecting zones of the badge upon an opto-electrical transducer, and means for processing signal pulses supplied by this transducer which includes a multiplicity of photoelectric sensors arranged in a linear array. The several sensors of the the transducer are switched on and off in a scanning sequence designed to analyze the distribution of the zones of the badge.

BRIEF DESCRIPTION OF THE DRAWING

The above and other features of the invention will become apparent from the following description of a representative embodiment of our improved system, given with reference to the accompanying drawing in which:

FIG. 1 is a schematic view of the overall system comprising an identifying device and a badge-carrying vehilcle, FIG. 2 is an enlarged view of the badge carried by the vehicle of FIG. 1;

FIG. 3 is a schematic view of the identifying device;

SPECIFIC DESCRIPTION

Figure 4:
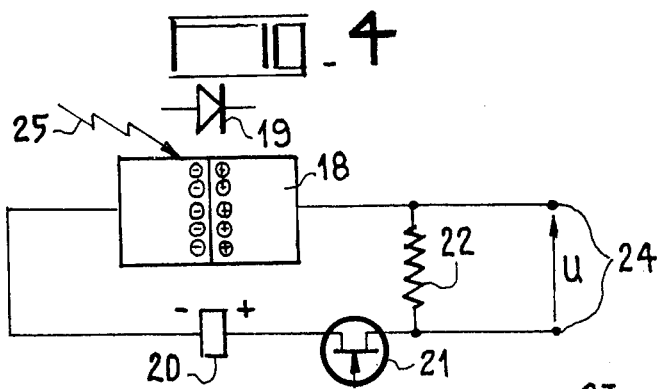
FIG. 4 is the circuit diagram of a photodiode included in the device

The remote-identification system shown in the drawing detects moving objects which, in general, pass along a certain path at a possibly high relative speed and bear information which enables them to be individually recognized. This information appears in code on a carrier attached to the object, such carriers being widely referred to at the present time as badges. The badge, which is relatively small in size, is attached to the body of a vehicle or to the side of a package to be identified.

FIG. 1 is a very schematic view of the overall system. An identifying device 1 takes the form of a box provided with an aperture 2 through which passes light from a source more fully described hereinafter. This light is trained upon a badge 3 which, in the embodiment described, is attached to one side of a motor car. At 5 is shown the line of sight of the device. Light energy reflected by the badge enters through opening 2 and is processed in device 1, by means of opto-electrical transducers and processing circuits.

The badge 3 is formed by a succession of areas which reflect or absorb the light which strikes them. The order in which they succeed one another represents the code which identifies the object to which the badge is attached.

FIG. 2 diagrammatically represents one form of badge which may be used with the device according to the invention. In the longitudinal direction along the X axis it has a certain number of columns 6 which reflect light from several strip zones, as more fully shown in FIG. 7, and which are separated by columns 7 which absorb the incident light. The columns are of a certain height H and the bottom of the badge is formed by a neutral, nonreflecting area 8, of height $h$. It is clear that the succession of the reflective and absorbent strip zones could be different from that illustrated in FIG. 7, e.g. horizontal.

FIG. 3 is a schematic view of the layout of the identification device. It has a light source 9, which may be an incandescent lamp, a quartz-iodine lamp or an electroluminescent diode and which emits white or monochrome light, and a transmitting optic 10 which shapes the outgoing light beam to allow it to illuminate the badge 3. A receiving optical 12 directs the reflected light beam, through an optional filter 13, onto a series of opto-electrical transducers 14, which in the present case are photodiodes of the integrated-circuit type. At 15 we have provided a circuit to supply power to the photodiodes 14 and to control the way in which they are switched on and off, and at 16 we have shown an output device including an amplifier, which processes the signals supplied by photodiodes 14. Device 16 is connected at 17 to utilization apparatus not shown.

The opto-electrical transducers used in accordance with the invention are photosensitive diodes arranged in a straight row. They are of integrated-circuit construction, which in particular allows them to be linearly arrayed without forming a bulky assembly.

FIG. 4 is a highly schematic circuit diagram of a photodiode and its control circuit. The photodiode is shown symbolically at 19 and structurally at 18 with positive and negative charges at its junction, an arrow 25 representing the illumination to which the diode is subjected. The power supply for the diode is indicated at 20 and at 21 we have shown a unijunction transistor which is fed via a conductor 23 and which controls the intermittent energization of the photodiode. A resistor 22 forms the load of the photodiode in question and its terminals 24 yield an output signal in the form of a voltage $u$ which is proportional to the illumination striking the photodiode.

Figure 5:
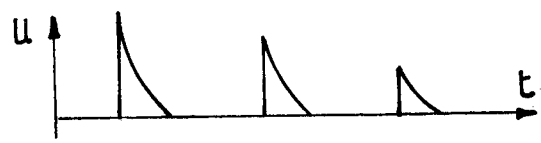
FIG. 5 is a graph showing the signals supplied by a set of such photodiodes.

FIG. 5 shows, as a function of time, the voltages $u$ which are delivered in this way by three photodiodes. The pulses are larger or smaller depending upon the illumination impinging on the three diode cells.

Figure 6:
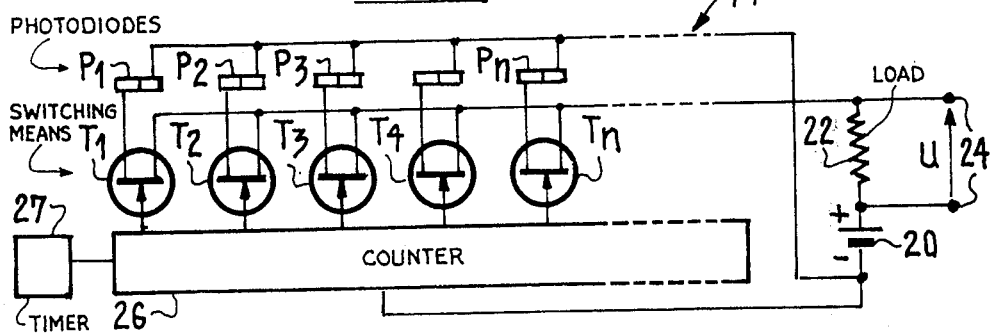
FIG. 6 is a schematic view of a row of photodiodes with a switching circuit therefor.

FIG. 6 is a schematic view of a row of such just described. The photodiodes are referenced Pl . . . Pn and the associated unijunction transistors, acting as electronic switches, are designated $T_1$ . . . $T_n$. A counter 26, stepped by a timer 27, has outputs tied to the gates of these transistors for sequentially energizing them. The power supply is again represented by a battery 20. The video signals which are produced by scanning the badge appear at the terminals 24 of load resistor 22 connected in parallel, by way of battery 20, across all series combinations of sensors $P_1$ - $P_n$ with electronic switches $T_1$ - $T_n$.

Figure 7:
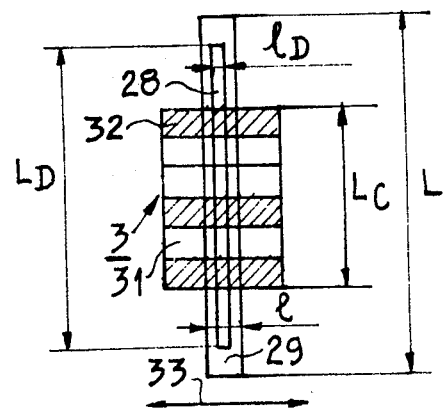
FIG. 7 is a diagrammatic view of a badge and a superposed image of a row of photodiode detectors.

If FIG. 5 is again referred to (this Figure shows the results of scanning with three units but the results can easily be extrapolated for a much larger number of photodetectors in order to arrive at a closer approximation to reality), it will be seen that two video peaks, i.e. two successive pulses, are separated by the time-base period, i.e. by a cycle of timer 27 in FIG. 7. With $n$ units, each unit is examined every $nT$ nanoseconds if, for example, the period T of the clock pulses from the timer equals 1 nsec.

As regards the way in which the badge is scanned in practice, reference may be had to FIG. 7 which is a schematic representation of the badge 3 superposed upon an image 28 of the row of photodiodes 14 shown in FIG. 3.

Optical systems 10 and 12 (FIG. 3) are so arranged that the image 28 of the row of photodiodes appears in the form of a rectangle of length $L_D$ and width $l_D$, whereas the cross-section of the incident light beam in the plane of the badge also forms a rectangle 29 whose dimensions L and l are slightly larger than those of the rectangle 28 representing the row of photodiodes. On the other hand it will be noted that the length $L_C$ of the target or badge 3 to be analyzed is less than the length $L_D$ of the row of photodiode detectors. This provides a certain amount of vertical tolerance when the badge and the photodiodes are so disposed that scanning takes place vertically, that tolerance being necessitated by the fact that the badges of different vehicles, for example, may not always be positioned the same elevation.

It will be noted that, in FIG. 7, the reflective stripe zones 31 and absorbent stripe zones 32 in a column 6 (FIG. 3) of the badge have major dimensions perpendicular to the image 28 of the row of photodiodes examining them. Since the movement of the object carrying the badge generally takes place in the directions indicated by horizontal arrow 33, the badge is scanned in a plurality of successive sweeps. However, the number of such scanning sweeps depends on the conditions under which identification takes place. A plurality of sweeps are carried out even when the carrier of the badge is stationary.

Under these conditions, it will be seen that each photodiode confronts at least one of the individual strip zones of the target. If this zone is reflective, the photodiode is illuminated and emits a pulse proportional to the illumination. If the zone is absorbent, the corresponding photodiode lies in a shadow area and gives no signal. Thus, if each photodiode in the row is interrogated cyclically and in turn, the code carried by the target badge can be read.

Figure 8:
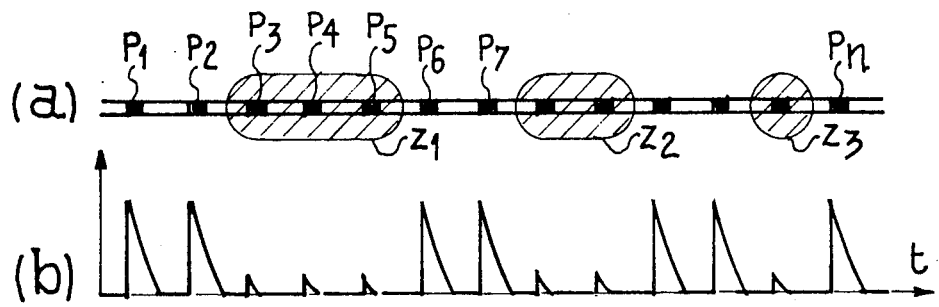
FIG. 8 is a schematic view of a row of photodiodes and superposed images of several nonreflecting areas, together with a graph showing the resulting signals.

FIG. 8 shows schematically at (a) a row of photodiodes $P_1$ - $P_n$, as in FIG. 6, superposed upon images $Z_1$, $Z_2$, $Z_3$ of non-reflective strip zones 32 (FIG. 7) which may each obscure one or more diodes. Graph (b) represents the video response from the row of photodiodes when interrogated, the amplitude of the pulses being proportional to the amount of light received by the photodiodes between two successive scanning sweeps.

In the foregoing description, it was assumed that the badge was parallel to the row of photodiodes at a specific distance which allowed proper operation, i.e. the imaging of a coded target area upon that row (and vice versa) by the optic 12 of FIG. 3. The requisite parameters are constants of the photoelectric transducer which can be altered to suit the conditions in which it is used and its constituent parts, such as the number of its diodes. The backing for the badge may be paper or some other material of the proper light-reflecting properties as determined the power of the light source used.

Figure 9:
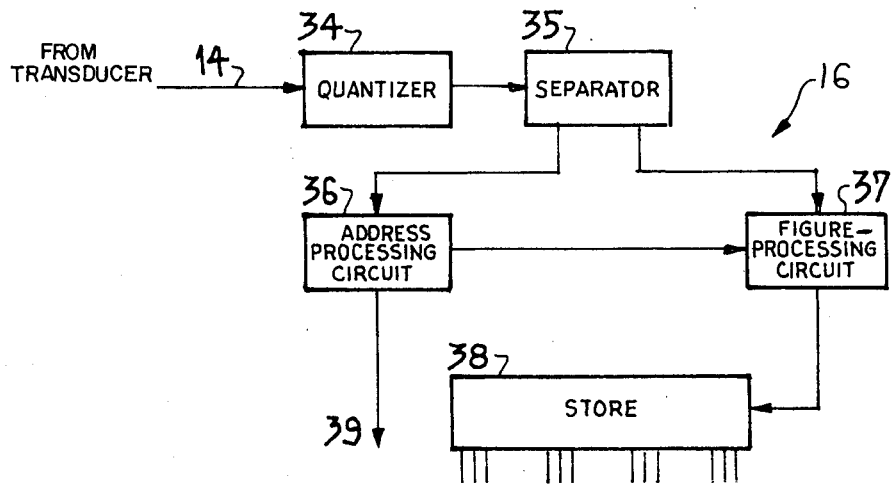
FIG. 9 shows a circuit arrangement for processing video signals supplied by the photodiodes.

FIG. 9 shows, by way of example, a circuit for processing the video information supplied by the opto-electrical transducers. This processing circuit is suitable for a badge consisting of a certain number of columns each of which carries a figure and its address. The analysis carried out by the photodiodes thus gives a video signal which conveys a certain number of items of numerical data representing the identity of the object carrying the badge, which it is necessary to translate.

The numerical processor 16, cf. FIG. 3, comprises a quantizing circuit 34 working into a circuit 35 which separates the figure from the address in the identification signal.

This circuit is followed, on the one hand, by a circuit 36 which processes the addresses and, on the other hand, by a circuit 37 which processes the figures or numerical characters under the control of circuit 36. The circuit 36 processing the addresses supplies at 39 a signal which indicates that there are no errors in an address, while the circuit 37 for processing the figures, whose result is verified, supplies an output store 38 which reproduces, in clear, the figures which form the identification number of the object.

The quantizing circuit 34 is fed by the video signal which is the output from the set of photodiodes and it has an output threshold allowing only the peaks of the pulses to reach the separating circuit 35.

Figure 10:
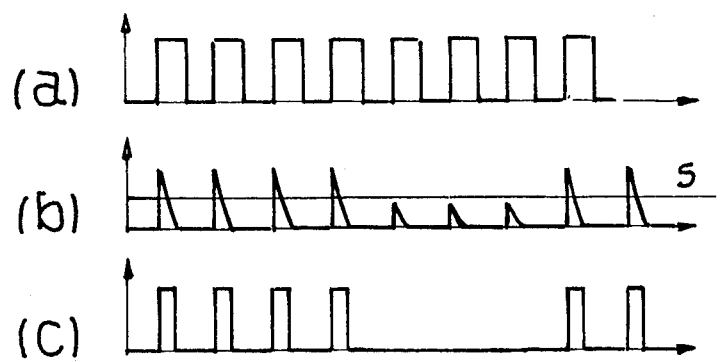
FIG. 10 is a set of graphs relating to the operation of the circuit shown in FIG. 9.

FIG. 10 relates to the operation of processor 16. Graph (a) shows the clock pulses. Waveform (b) shows the video signal and the threshold whereas graph (c) shows the quantized video signal.

In the embodiment described, the separation between the address and the figure is based on the fact that the figure is formed by the reflecting areas of a column 6 of the badge 3 (FIG. 2) and the address is indicated by the non-reflecting intervals 7. Thus, in the pulse trains which are processed, the pulses are the electrical counterpart of the figures forming an object's identification number and the intervals between them represent the electrical counterpart of the address recorded on the badge.

In the present instance, the address may be processed in circuit 36 by detecting the length of black intervals on the badge, with the digits 1 and 0 in the address being of different lengths, e.g. five to ten clock cycles for logic 1 and two to four periods for logic 0. The address may be formed by four numerical symbols, for example, and comparing it with a master code enables it to be decoded and the figure subsequently to be verified. Each black interval, of course, results in a temporary nonillumination of the entire array of sensors, with consequent interruption of the sequence of signal pulses transmitted to quantizer 34 on the output lead of transducer 14. The signal which appears at 39 indicates that the number of addresses appropriate to the complete word carried by the badge has been decoded.

The figures are processed in circuit 37 by means of pulse counting, with the numerical symbol for 1 consisting of five to ten pulses for example while the 0 symbol consists of only one to four pulses. The number which in the example selected will therefore consist of five binary symbols 1 or 0 is compared with an initial two-out-of five code, is decoded, and is then stored at 38 after being verified by the address-processing circuits.

Monitoring circuits are provided but they are not shown in the drawing and have not been described.

Processing of the same kind may also be applied when the badge has only a single column.

As will be apparent from the foregoing description, the operation of our improved remote-identification system is as follows: An area 29 (FIG. 7) illuminated by light source 9, FIG. 3, via optic 10 is imaged by optic 12 upon the linear array of photoelectric sensors 14. When the illuminated area 29 registers with a column of a badge 3, the reflecting and non-reflecting strip zones 31, 32 of that column cast a pattern of shadows $Z_1$-$Z_3$ onto the array as seen in FIG. 8. By a sequential actuation of sensors 14, the distribution of these shadows and the intervening light spots is scanned and the sequence of pulses generated in the sensor outputs can be translated into signals appearing on the outputs of a processing device such as the store 38 of FIG. 9. Obviously, the scanning speed must be high compared with the relative speed, if any, of the array of sensors and the badge.

What is claimed is:

1. A system for the remote identification of objects each provided with an area carrying a multiplicity of light-reflecting zones separated by non-reflecting zones, said zones forming a code identifying the respective object, comprising:
    a source of light emitting a steady beam for illuminating said area;
    an array of photoelectric sensors;
    optical means trained upon said area for imaging said zones upon said array, thereby casting a pattern of shadows and light spots onto said sensors;
    scanning means for sequentially actuating said sensors in a predetermined order, thereby generating signal pulses in the outputs of sensors illuminated by a light spot of said pattern;
    quantizing means connected to said sensors for suppressing signal pulses below a predetermined threshold;
    processing means connected to said quantizing means for determining the distribution of said zones from the sequence of occurrence of unsuppressed signal pulses; and
    storage means connected to said processing means for registering a representation of said sequence.

2. A system as defined in claim 1, wherein said sensors are photosensitive diodes in integrated circuits.

3. A system as defined in claim 1 wherein said array is linear, the image of said area being a rectangle encompassing said array.

4. A system as defined in claim 1 wherein said scanning means comprises a set of electronic switches each in series with a respective sensor, a generator of clock pulses, and a pulse counter connected to said generator for stepping by said clock pulses, said pulse counter having respective output connections to said electronic switches.

5. A system as defined in claim 4, further comprising a load impedance connected in parallel across all series combinations of sensors and electronic switches.

6. A system as defined in claim 4 wherein said clock pulses have a period on the order of one nanosecond.

7. A system for the remote identification of vehicles each provided with a badge divided into a plurality of generally rectangular vertical columns, each column consisting of a multiplicity of vertically superposed zones of varying height which are alternately reflective and non-reflective of incident light to provide a code identifying the respective vehicles, comprising:
    a source of light;
    first optical means juxtaposed with said source for producing a steady beam illuminating a generally rectangular vertical area along the path of said vehicles positioned to register with the zones of a column of a badge on a vehicle passing along said path;
    a linear array of photoelectric sensors remote from said path;
    second optical means trained upon said area for imaging said zones upon said array, thereby casting a pattern of shadows and light spots onto said sensors;
    scanning means for sequentially actuating said sensors in a predetermined order, thereby generating signal pulses in the outputs of sensors illuminated by a light spot of said pattern;

quantizing means connected to said sensors for suppressing signal pulses below a predetermined threshold;

processing means connected to said quantizing means for determining the vertical distribution of said zones in each column of a badge from the sequence of occurrence of said signal pulses; and storage means connected to said processing means for registering a representation of said sequence.

8. A system as defined in claim 7 wherein said zones are substantially horizontal strips extending beyond the width of said area, said scanning means being effective to actuate each sensor several times during registration thereof with the image of a strip zone on a vehicle moving past.

9. A system as defined in claim 7 wherein said columns are spaced apart by vertical non-reflecting intervals of different width defining an address code, said processing means including a circuit separating said signal pulses from address-code signals resulting from recurrent nonillumination of the entire array due to said intervals.

10. A system as defined in claim 9 wherein said zones are parts of numerical characters, said processing means further including circuitry for reproducing said numerical characters.

* * * * *